(12) United States Patent
Murakami et al.

(10) Patent No.: US 9,915,982 B2
(45) Date of Patent: Mar. 13, 2018

(54) DISPLAY DEVICE AND DISPLAY DEVICE MANUFACTURING METHOD

(71) Applicant: FURUNO ELECTRIC CO., LTD., Nishinomiya, Hyogo (JP)

(72) Inventors: Kenichi Murakami, Kobe (JP); Daigo Dohi, Takarazuka (JP)

(73) Assignee: FURUNO ELECTRIC COMPANY LIMITED, Nishinomiya, Hyogo (JP)

(*) Notice: Subject to any disclaimer, the term of this patent is extended or adjusted under 35 U.S.C. 154(b) by 112 days.

(21) Appl. No.: 14/968,077

(22) Filed: Dec. 14, 2015

(65) Prior Publication Data

US 2016/0183388 A1    Jun. 23, 2016

(30) Foreign Application Priority Data

Dec. 19, 2014  (JP) .................................. 2014-256784

(51) Int. Cl.
  *G06F 1/18*  (2006.01)
  *H05K 5/02*  (2006.01)

(52) U.S. Cl.
  CPC .............. *G06F 1/184* (2013.01); *G06F 1/188* (2013.01); *G06F 1/189* (2013.01); *H05K 5/02* (2013.01)

(58) Field of Classification Search
  CPC .......... G06F 1/184; G06F 1/189; G06F 1/188; H05K 5/02
  See application file for complete search history.

(56) References Cited

U.S. PATENT DOCUMENTS

| | | | | |
|---|---|---|---|---|
| 6,049,973 A | * | 4/2000 | Frank, Jr. | G06F 1/1601 29/830 |
| 6,595,315 B1 | * | 7/2003 | Fujimoto | G01S 7/6218 181/124 |
| 2002/0039286 A1 | * | 4/2002 | Frank, Jr. | G06F 1/16 361/818 |
| 2007/0008243 A1 | * | 1/2007 | Jeong | H05K 5/02 345/60 |
| 2007/0290589 A1 | * | 12/2007 | Shin | H05K 5/02 313/46 |

(Continued)

FOREIGN PATENT DOCUMENTS

JP    2002-077677 A    3/2002

*Primary Examiner* — Zachary M Pape
*Assistant Examiner* — Douglas Burtner
(74) *Attorney, Agent, or Firm* — Studebaker & Brackett PC

(57) ABSTRACT

A display device is provided which suppresses cost increases attributable to design changes and so forth for things disposed on the inside of a product when a plurality of products of different screen size are developed, or when the screen size is changed. A display device 5 includes a display panel 11, a first board attachment component 13, a display panel board 18, a second board attachment component 21, a main board 22, a third board attachment component 23, and a power supply board 24. The main board 22 stores a plurality of display programs that produce an image to be displayed on the display panel 11, according to the screen size of the display panel 11. The first board attachment component 13, the display panel board 18, the second board attachment component 21, the main board 22, the third board attachment component 23, and the power supply board 24 are disposed in this order, starting from the display panel 11 side, on the rear side of the display panel 11.

10 Claims, 11 Drawing Sheets

(56) References Cited

U.S. PATENT DOCUMENTS

| | | | | |
|---|---|---|---|---|
| 2008/0074349 | A1* | 3/2008 | Hong | G02F 1/133308 345/55 |
| 2008/0266772 | A1* | 10/2008 | Kim | H05K 7/1461 361/679.02 |
| 2009/0034180 | A1* | 2/2009 | Lee | G06F 1/1601 361/679.27 |
| 2009/0059499 | A1* | 3/2009 | Ono | H05K 5/02 361/679.26 |
| 2009/0135577 | A1* | 5/2009 | Jeong | H05K 5/02 361/816 |
| 2009/0145637 | A1* | 6/2009 | Kanouda | H05K 3/0061 174/255 |
| 2009/0153766 | A1* | 6/2009 | Lee | G02F 1/133308 349/58 |
| 2011/0242743 | A1* | 10/2011 | Moon | H05K 5/02 361/679.01 |
| 2011/0246948 | A1* | 10/2011 | Yamaguchi | G06F 3/0418 715/846 |
| 2014/0092631 | A1* | 4/2014 | Fujii | G09F 9/30 362/611 |
| 2015/0036077 | A1* | 2/2015 | Lee | G02B 6/0081 349/65 |
| 2015/0109344 | A1* | 4/2015 | Tomono | G06T 1/20 345/661 |
| 2015/0138111 | A1* | 5/2015 | Akieda | G06F 3/016 345/173 |
| 2015/0195924 | A1* | 7/2015 | Ahn | H05K 5/02 361/679.01 |
| 2016/0259514 | A1* | 9/2016 | Sang | G06F 3/04817 |
| 2016/0284286 | A1* | 9/2016 | Maruyama | G09G 3/2096 |
| 2016/0306534 | A1* | 10/2016 | Woo | G06F 3/04847 |

\* cited by examiner

DISPLAY DEVICE AND DISPLAY DEVICE MANUFACTURING METHOD

CROSS-REFERENCE TO RELATED APPLICATIONS

This application claims priority to Japanese Patent Application No. 2014-256784 filed on Dec. 19, 2014. The entire disclosure of Japanese Patent Application No. 2014-256784 is hereby incorporated herein by reference.

BACKGROUND

Field of the Invention

The present invention relates mainly to a display device equipped with a plurality of internal boards.

Background Information

In the field of products that have a display screen (such as navigation units and personal computers), a number of products with different screen sizes are sometimes developed in order to meet the diverse needs of customers. Also, changes to the specifications of a product sometimes dictate the new development of a product whose screen size is different from that of the existing product. When screen sizes are different, usually the size of the housing is also different, so the shapes of the boards and board attachment components disposed internally are often also different.

Japanese Laid-Open Patent Application Publication No. 2002-77677 (Patent Literature 1) discloses a digital camera with a configuration that does not require external panels to be changed, even when the size of a liquid crystal panel is changed, by using a liquid crystal panel holder that is compatible with that liquid crystal panel.

SUMMARY

Patent Literature 1, however, merely discloses a configuration that allows external panels to be shared, and the sharing of internal parts is neither discussed nor alluded to. Accordingly, when developing a plurality of products having different sizes of liquid crystal panel, or when changing the size of a liquid crystal panel, etc., it is necessary to newly design the internal parts and so forth.

As a result, the parts disposed internally (boards, board attachment components, and so forth) have been newly designed, tested, manufactured, managed, etc. Therefore, what is disclosed in Patent Literature 1 does not afford much of a reduction in cost.

The present invention was conceived in light of the above situation, and its primary object is to provide a display device with which cost increases attributable to design changes and so forth in the parts disposed internally in a product can be kept low when developing a plurality of products with different screen sizes or when changing the screen size.

A first aspect of the present invention provides a display device with the following configuration. This display device comprises a display panel, a first board attachment component, a display panel board, a second board attachment component, a main board, a third board attachment component, and a power supply board. The display panel is configured to display an image. The display panel board is attached to the first board attachment component and is configured to control hardware dependent on the screen size of the display panel. The main board is attached to the second board attachment component, is configured to store a plurality of display programs that produce the image to be displayed on the display panel, according to the screen size of the display panel, and is configured to perform control for displaying the image on the display panel by using one of the stored display programs. The power supply board is attached to the third board attachment component and is configured to supply power used by the display panel board and the main board. The first board attachment component, the display panel board, the second board attachment component, the main board, the third board attachment component, and the power supply board are disposed in this order, starting from the display panel side, on the rear side of the display panel.

Consequently, since the main board stores programs corresponding to a plurality of display panels, at least the main board and the second board attachment component that supports it can be shared. Therefore, cost increases that are attendant to a change in the screen size of a display panel can be kept low.

The above display device preferably has the following configuration. This display device comprises a display panel-side housing and a control-side housing. The display panel-side housing covers at least part of the display panel. The control-side housing is attached to the display panel-side housing. The control-side housing is attached only to the display panel-side housing, out of the display panel-side housing, the first board attachment component, the second board attachment component, and the third board attachment component.

Consequently, the control-side housing is attached to the display panel-side housing after attachment of the boards and board attachment components has been completed. Accordingly, in attaching the control-side housing to the display panel-side housing, the cables that connect the boards together can be prevented from being pinched between the two housings.

The above display device preferably has the following configuration. When the display panel-side housing, the display panel, the first board attachment component, and the display panel board form a display panel block, and the control-side housing, the second board attachment component, the main board, the third board attachment component, and the power supply board form a control block, then the control block is connected using the same interface with a plurality of types of display panel blocks having different screen sizes.

Consequently, since members not dependent on the screen size of the display panel are configured as the control block, many members can be shared, which minimizes cost increases attendant to changes in the screen size of the display panel.

The above display device preferably comprises a wired signal transmission component configured to transmit signals from an external device to the main board without going through the power supply board.

Consequently, since signals from an external device are transmitted directly to the main board, without going through the power supply board, less noise will be included in the signals.

The above display device is preferably such that the signal transmission component includes at least one of a LAN cable, a USB cable, and an image transmission cable.

This suppresses the occurrence of image distortion, communication problems, and so forth.

With the above display device, a cutout is preferably formed in at least one of the third board attachment component and the power supply board, and the signal transmission component is disposed to pass through the cutout.

Consequently, the signal transmission component will have to flex fewer times, which means less load on the cable, and routing of the cable during manufacture will be even simpler.

With the above display device, the display panel board preferably performs at least one of control related to a backlight and control related to a touch screen.

Consequently, control related to a backlight and a touch screen depends on the screen size of the display panel, so performing this control with a display panel board makes it easier to share other members.

With the above-mentioned display device, the main board is preferably configured to automatically read one of the display programs corresponding to the screen size of the display panel by being connected to the display panel or the display panel board.

For instance, when a switch corresponding to the screen sizes of display panels is provided to the main board, the worker must operate the switch during the manufacture of the display device. Employing the above-mentioned configuration eliminates the need for this switching, and since no human error can occur, the proper display program can be reliably applied.

A second aspect of the present invention provides the following display device manufacturing method. This method includes first, second, third, fourth, fifth, and sixth steps. The first step involves attaching a first board attachment component to the rear side of a display panel that is configured to display an image. The second step involves attaching a display panel board that is configured to control hardware dependent on the screen size of the display panel, to the rear face of the first board attachment component, where the rear side is the opposite side from the side where the display panel is located. The third step involves attaching the second board attachment component further to the rear side than the display panel board. The fourth step involves attaching a main board that is configured to store a plurality of display programs that produce the image to be displayed on the display panel, according to the screen size of the display panel, and is configured to perform control for displaying the image on the display panel by using one of the stored display programs, on the rear face of the second board attachment component. The fifth step involves attaching the third board attachment component further to the rear side than the main board. The sixth step involves attaching a power supply board that is configured to supply power used by the display panel board and the main board, to the rear face of the third board attachment component.

Consequently, because the manufacture is performed such that the various members are stacked up from the display panel, the manufacturing process can proceed while the boards are connected by cables, and this simplifies the manufacturing process.

It is preferable to do the following in the above-mentioned display device manufacturing method. In the first and second steps, the first board attachment component and the display panel board that are selected according to the screen size of the display panel are used. In the third, fourth, fifth, and sixth steps, the second board attachment component, the main board, the third board attachment component, and the power supply board that have a configuration that is not dependent on the screen size of the display panel are used.

Consequently, because a plurality of members that are not dependent on the screen size of the display panel can be shared, there will be fewer cost increases attendant to changing the screen size of a display panel.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents. First, a display device 5 in this embodiment will be described through reference to FIG. 1.

The display device 5 is connected to a plurality of marine devices, and is used to display images produced by these marine devices on its screen. More specifically, as shown in FIG. 1, the display device 5 is connected to an external power supply 1, a fish finder 2, and a sea navigation image generation device 3.

The external power supply 1 supplies power to the display device 5. The fish finder 2 emits ultrasonic waves toward the water, and receives reflected waves produced when these ultrasonic waves are reflected by a school of fish, the seafloor, or the like. The fish finder 2 analyzes these reflected waves and outputs the fish school images thus produced to the display device 5. The sea navigation image generation device 3 outputs to the display device 5 sea navigation images, which are images in which the position of the vessel detected by a GPS receiver or the like is superimposed over a sea chart. The display device 5 may also be connected to marine devices other than those discussed above (such as a radar device).

Figure 1:
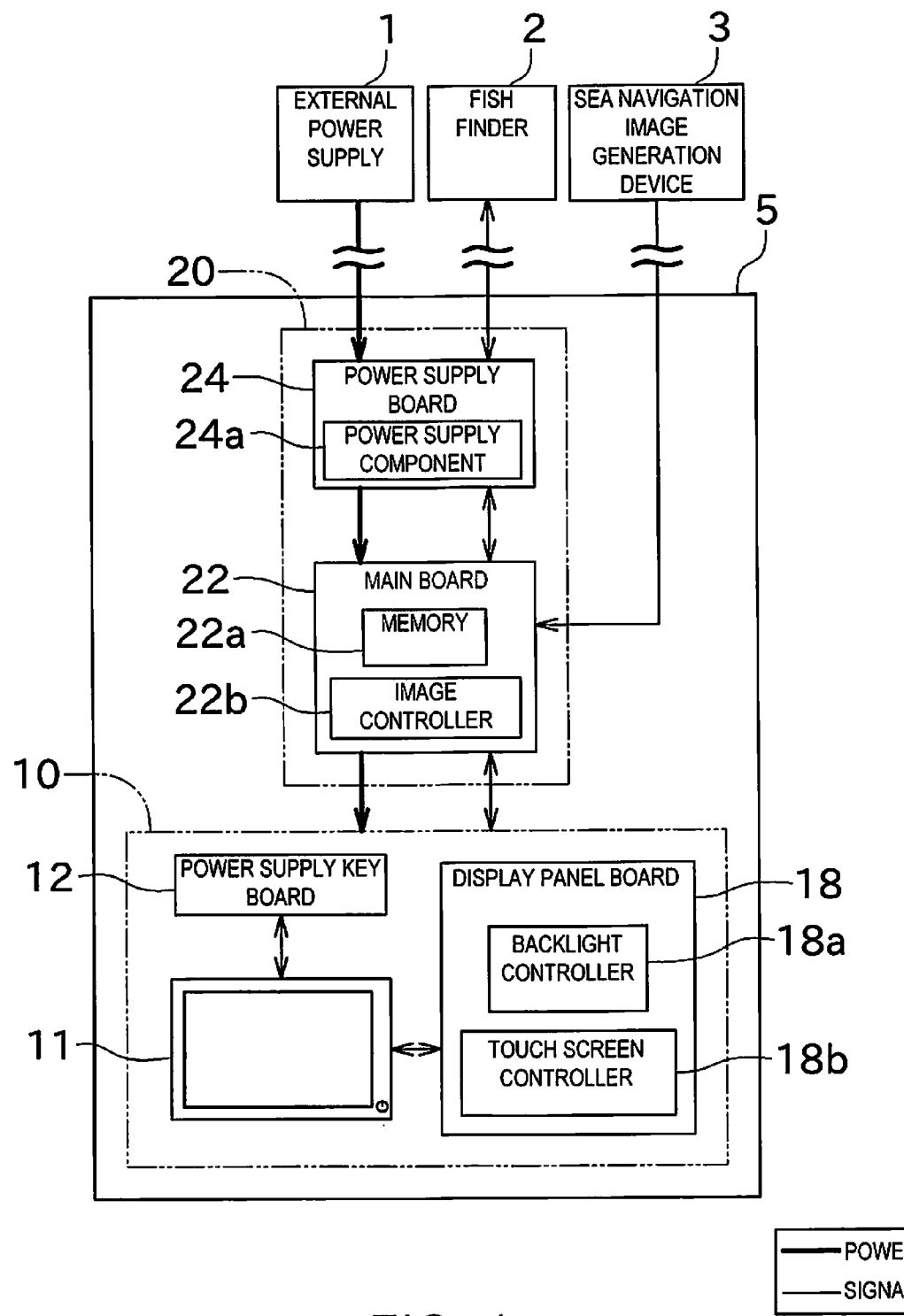
FIG. 1 is a block diagram of the display device pertaining to an embodiment of the present invention, and of devices connected to this display device.

As shown in FIG. 1, the display device 5 comprises a main board 22, a power supply board 24, a display panel 11, a power supply key board 12, and a display panel board 18 as its electrical configuration.

The display panel 11 is electrically connected to the display panel board 18 and the main board 22. The display panel 11 is able to display images by inputting image signals from the main board 22 and so forth. The display panel 11 in this embodiment is configured as a liquid crystal panel that has a touch screen function. Since the display panel 11 is a liquid crystal panel, a backlight is disposed in the interior of the display panel 11. The display panel 11 is not limited to being a liquid crystal panel, and may instead be an organic EL panel or a plasma display, for example. Also, it need not have a touch screen function. A power supply key (a physical key) is disposed on the front side (the display screen side) of the display panel 11.

The power supply key board 12 is electrically connected to the power supply key of the display panel 11. When the power supply key is pressed, the power supply key board 12 outputs a signal to this effect to the main board 22.

The display panel board 18 is electrically connected to the display panel 11 and the main board 22. The display panel board 18 controls the display panel 11, and in particular controls hardware that is dependent on the screen size of the display panel 11. More specifically, the display panel board 18 comprises a backlight controller 18a and a touch screen controller 18b. The backlight controller 18a performs control related to the brightness of the backlight of the display panel 11, whether or not it is lit, and so on. The touch screen controller 18b performs control related to sensing the touch operation performed on the display panel 11.

The main board 22 is a digital board, and is electrically connected to the display panel 11 and the various boards constituting the display device 5. Image signals from the sea navigation image generation device 3 and other such external devices are inputted to the main board 22. The main board 22 performs various kinds of control related to the display device 5, and in particular controls the display of images on the display panel 11. The main board 22 comprises a memory 22a made up of a ROM, etc., and an image controller 22b made up of a CPU, etc.

The memory 22a stores programs executed by the main board 22. In particular, the memory 22a in this embodiment stores a plurality of display programs that produce images to be displayed on the display panel 11, according to the screen size of this display panel 11. Of the display programs stored in the memory 22a, the image controller 22b uses the one corresponding to the screen size of the connected display panel 11 to control the display of images on the display panel 11.

Also, when the main board 22 is connected to the display panel 11 or a display panel-side housing 14, the screen size (such as the number of inches) of the display panel 11 is acquired, and the display program corresponding to the acquired screen size is applied. The switching of display programs may be performed by operating a physical key that is used to switch the display program and is provided to the main board 22. If the switching of the display program is performed automatically as in this embodiment, there will be no need for this switching work, and since human error cannot occur, the proper display program can be reliably applied.

The power supply board 24 is an analog board, and is connected to the main board 22. Power is supplied from the external power supply 1 to the power supply board 24, and an image signal is inputted from the fish finder 2. The power supply board 24 comprises a power supply component 24a. The power supply component 24a adjusts the voltage and so forth of the power supplied from the external power supply 1, and then supplies the product to the main board 22. Some of the power supplied to the main board 22 is consumed by the main board 22, and the rest is outputted to the display panel 11, the power supply key board 12, the display panel board 18, and so on.

In this embodiment, the cable of the sea navigation image generation device 3 is connected to the main board 22 without going through the power supply board 24. Because image signals are thus transmitted directly from the sea navigation image generation device 3, without going through the power supply board 24, increases in noise in the image signals can be prevented.

The mechanical configuration and assembly method of the display device 5 will now be described through reference to FIGS. 2 to 9.

Figure 2:
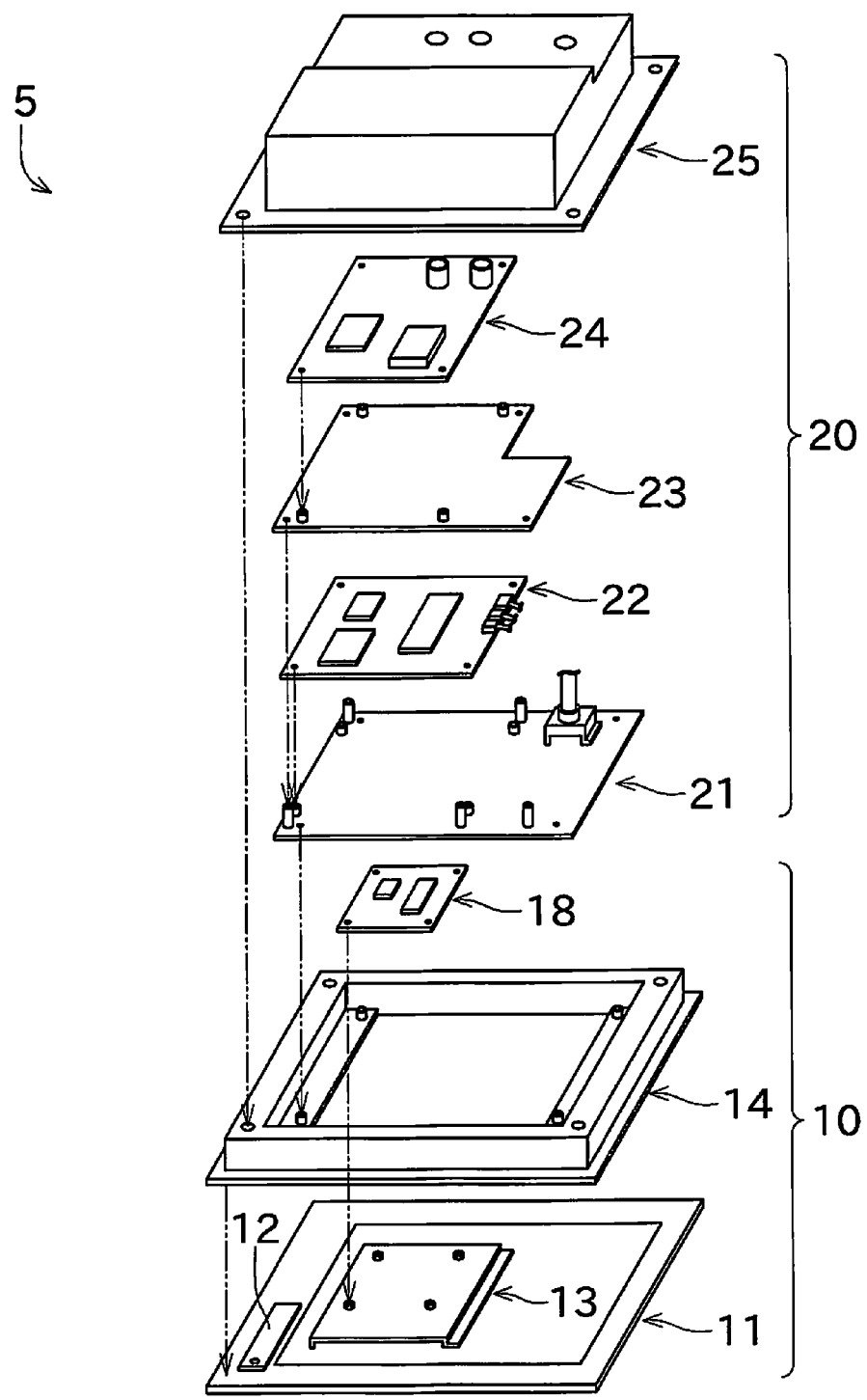
FIG. 2 is an exploded oblique view of a display device.

As shown in FIG. 2, the display device 5 has a plurality of members (boards and board attachment components) attached to the rear side of the display panel 11 (the opposite side from the display screen). Assembly of the display device 5 is performed by stacking a first board attachment component 13, the display panel-side housing 14, the display panel board 18, a second board attachment component 21, the main board 22, a third board attachment component 23, the power supply board 24, and a control-side housing 25 in this order on the rear side of the display panel 11. This will be described in specific terms below. In the following description, the display screen side is referred to as the front, and the opposite side as the rear.

Figure 3:
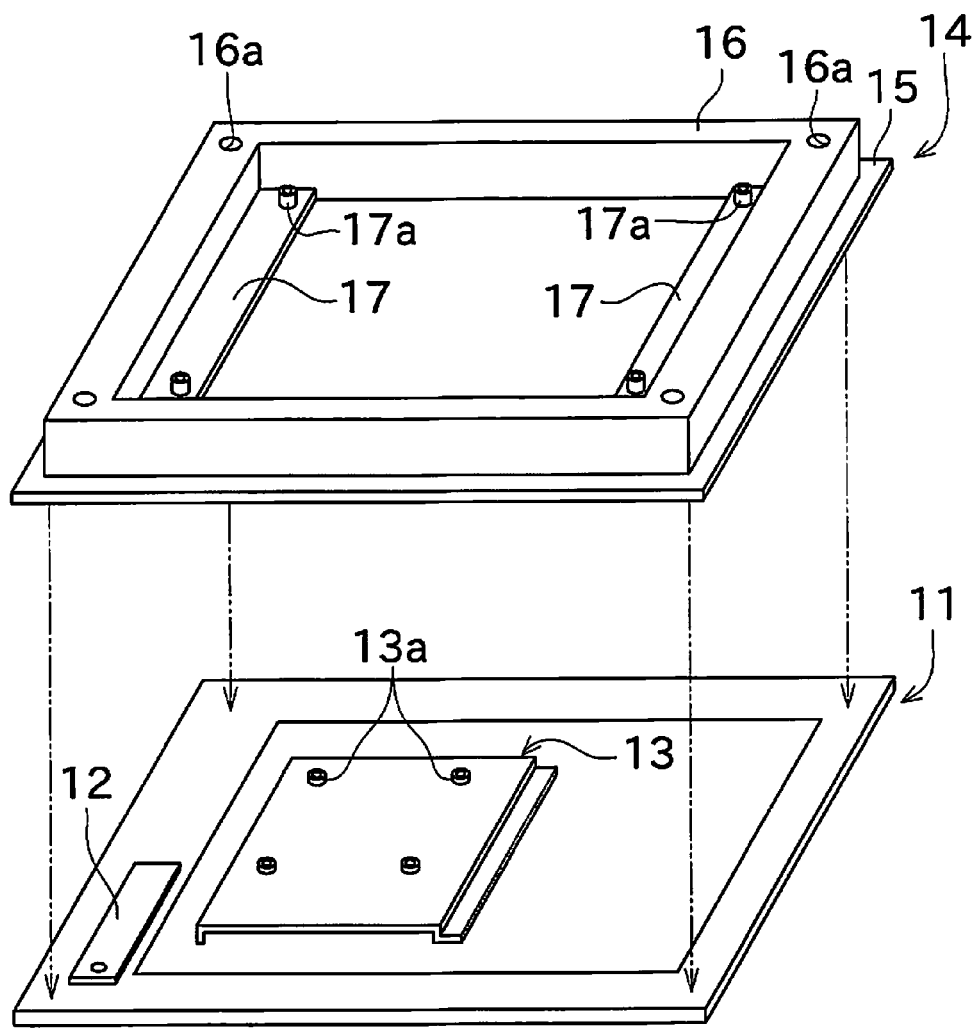
FIG. 3 is an oblique view of when a display panel housing is attached.

As shown in FIG. 3, the above-mentioned power supply key board 12 and the first board attachment component 13 are attached to the rear face of the display panel 11. The first board attachment component 13 is metal of sheet metal, and a plurality of protrusion attachment holes 13a are formed in the rear face of the first board attachment component 13. The protrusion attachment holes 13a are protruding cylindrical members with holes formed in their interiors.

The display panel-side housing 14 is attached with an adhesive agent or the like to the rear face of the display panel 11. The display panel-side housing 14 covers at least the display panel board 18, the first board attachment component 13, the power supply key board 12, and the part of the display panel 11. The display panel-side housing 14 comprises a display panel connector 15, a housing connector 16, and a board attachment component connector 17.

The display panel connector 15 is a portion on the front side of the display panel-side housing 14, and is connected to the display panel 11. The housing connector 16 is a frame-like member protruding to the rear from the display panel connector 15. A plurality of attachment holes 16a are formed in the housing connector 16. The board attachment component connector 17 is a portion formed in the interior of the housing connector 16. Protrusion attachment components 17a is formed on the board attachment component connector 17.

Figure 4:
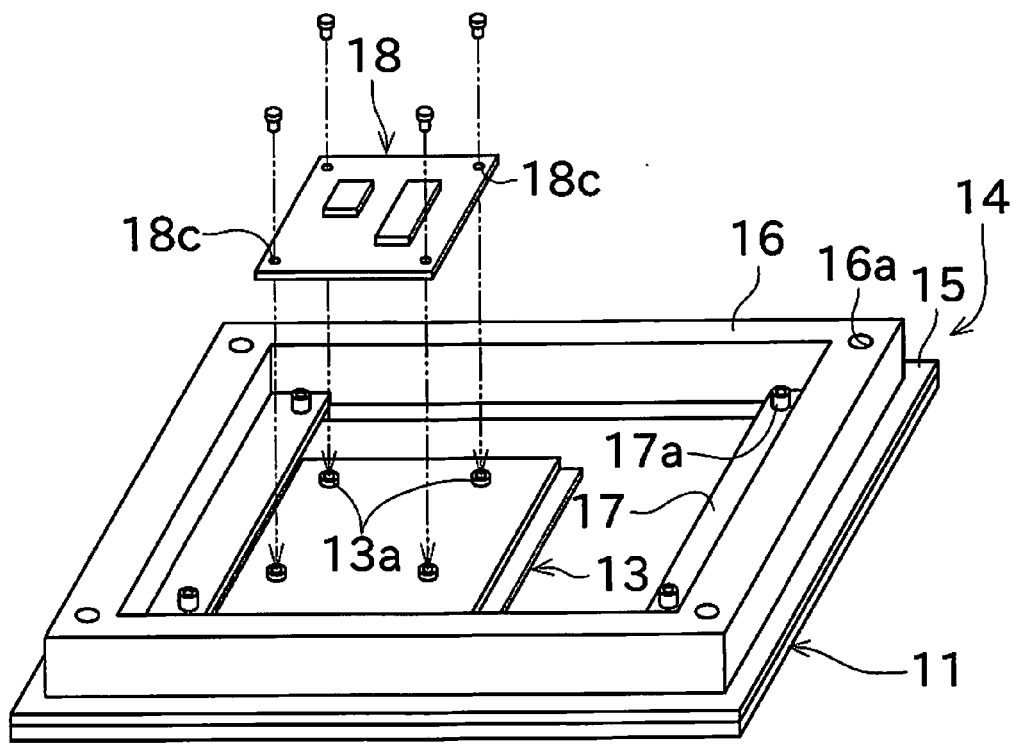
FIG. 4 is an oblique view of when a display panel board is attached.

As shown in FIG. 4, in the next step the display panel board 18 is attached. A plurality of attachment holes 18c are formed in the display panel board 18. The display panel board 18 is attached to the first board attachment component 13 by inserting screws into the attachment holes 18c and the protrusion attachment holes 13a and tightening.

Figure 5:
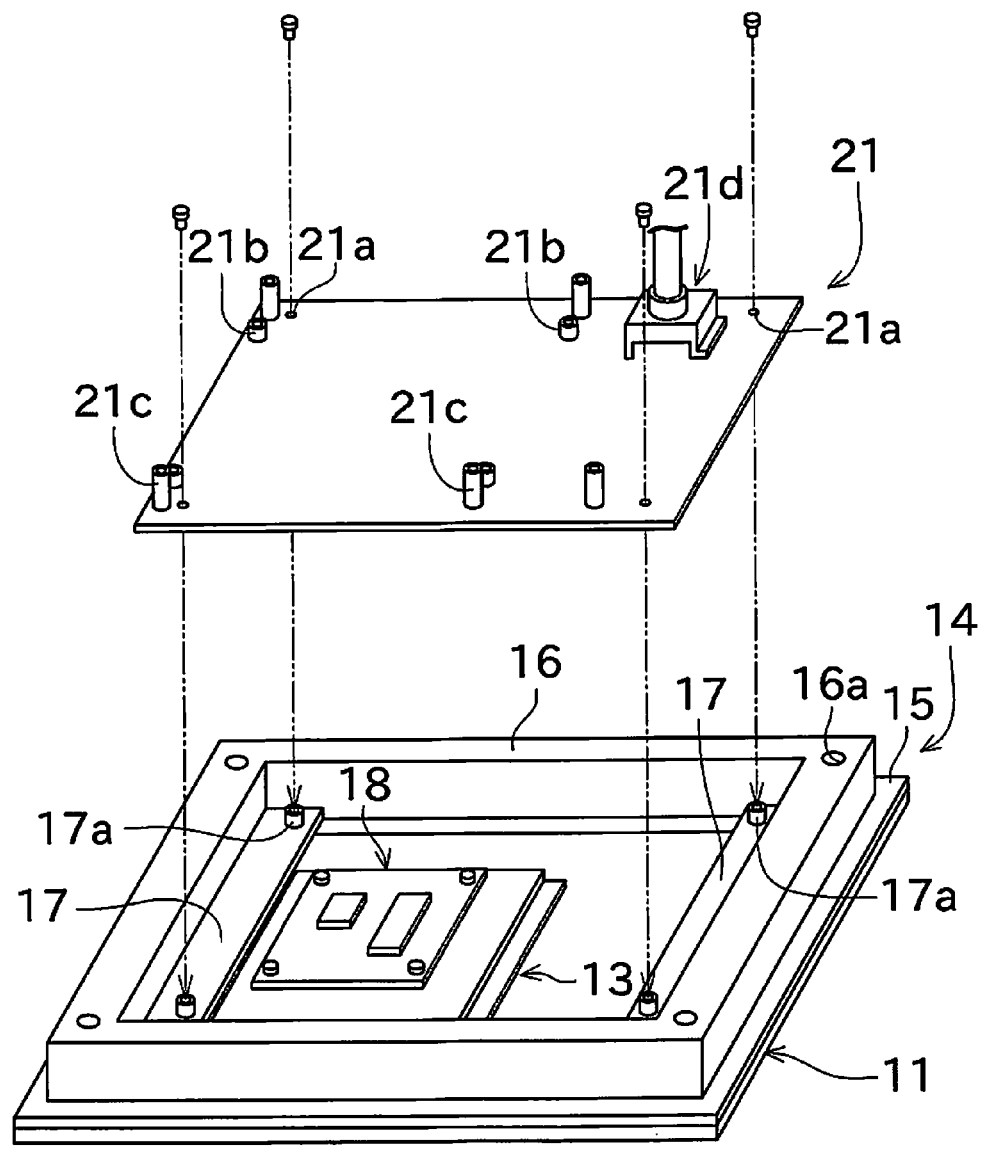
FIG. 5 is an oblique view of when a second board attachment component is attached.
Figure 7:
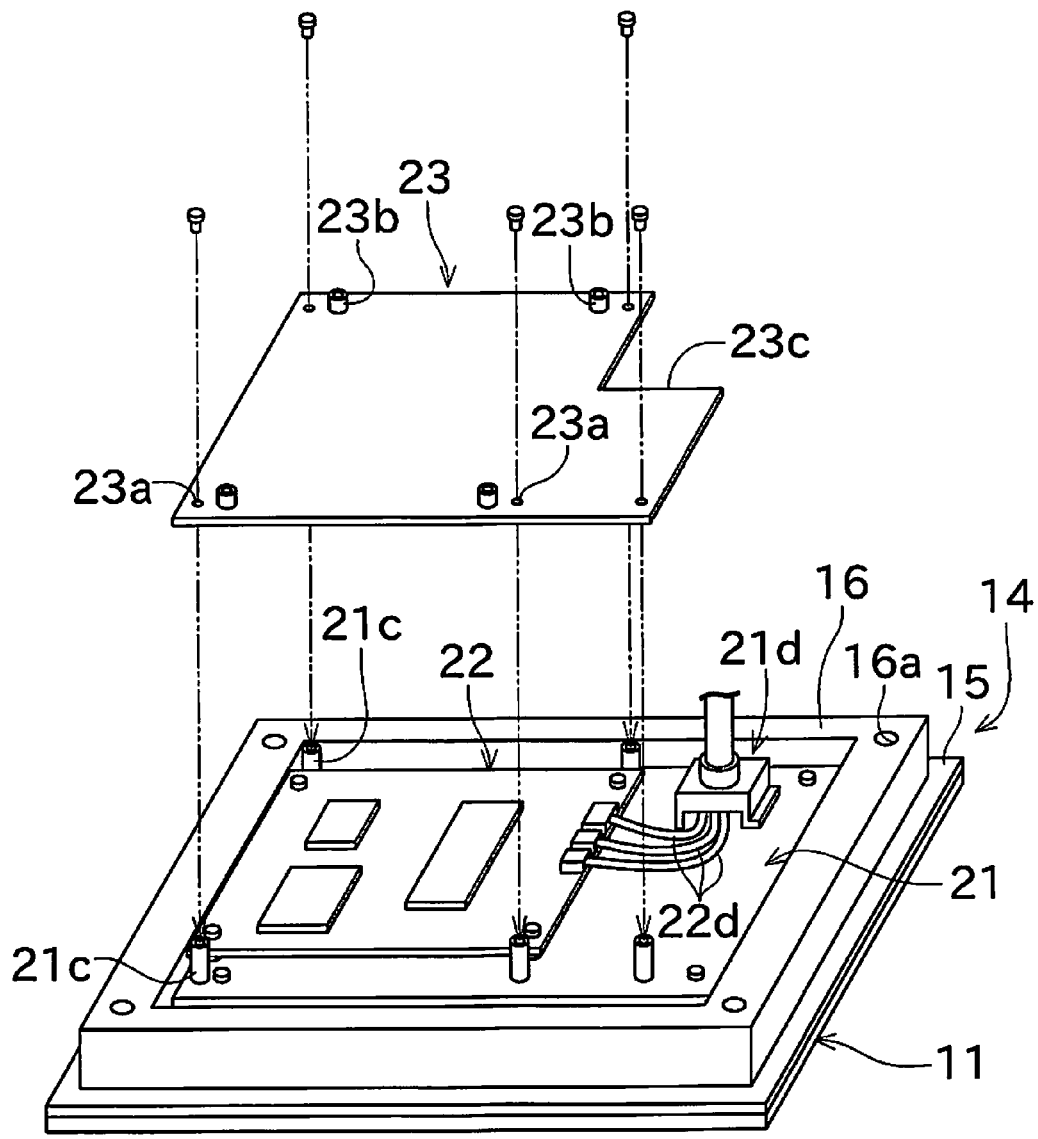
FIG. 7 is an oblique view of when a third board attachment component is attached.

As shown in FIG. 5, in the next step the second board attachment component 21 is attached. The second board attachment component 21 is a member made of sheet metal. Attachment holes 21a, first protrusion attachment holes 21b, second protrusion attachment holes 21c, and a cable protector 21d are formed on the second board attachment component 21. The second protrusion attachment holes 21c stick out farther than the first protrusion attachment holes 21b. The cable protector 21d is made up of a member that guides a cable into the interior, and a cylindrical member that protects the cable, as shown in FIG. 7 (discussed below). The second board attachment component 21 is attached to the display panel-side housing 14 (more precisely, to the board attachment component connector 17) by inserting screws into the attachment holes 21a and the protrusion attachment components 17a and then tightening.

The display panel 11, the first board attachment component 13, the display panel-side housing 14, and the display panel board 18 are members that are dependent on the screen size of the display panel 11. Hereinafter these members will be collectively referred to as a display panel block 10.

Figure 6:
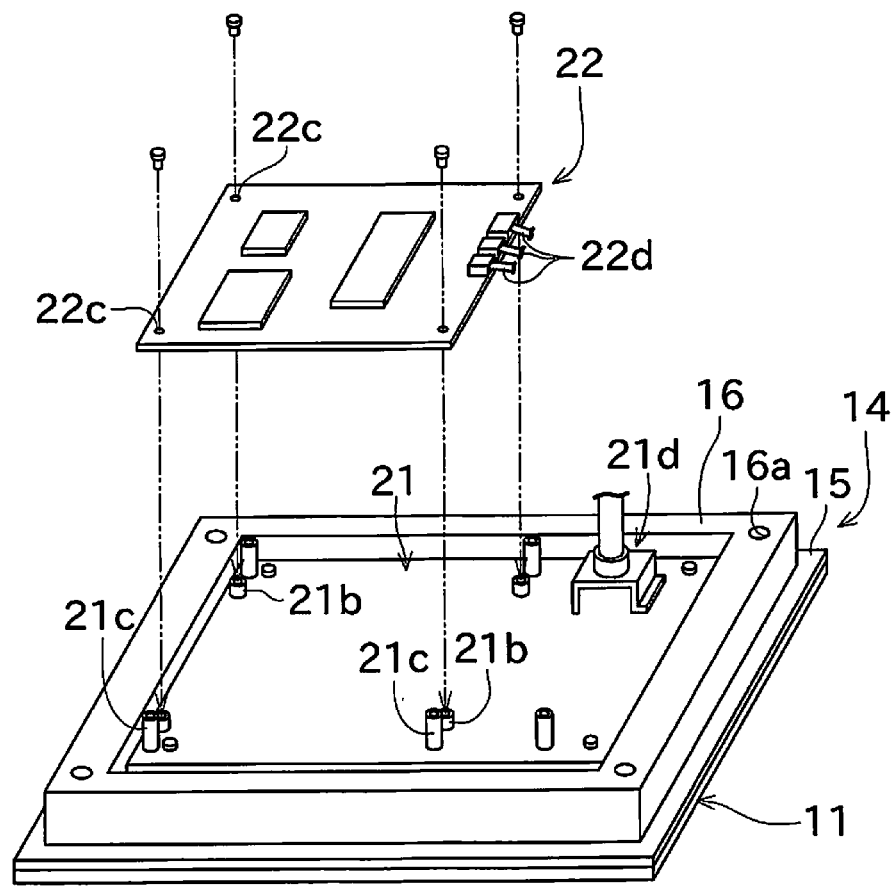
FIG. 6 is an oblique view of when a main board is attached.

As shown in FIG. 6, in the next step the main board 22 is attached. A plurality of attachment holes 22c are formed in the main board 22. Cables 22d (signal transmission components) used for communicating with external devices are connected to the main board 22. The cables 22d can be, for example, a LAN cable, a USB cable, an image transmission cable through which sea navigation images are inputted from the sea navigation image generation device 3, or the like. The main board 22 is attached to the second board attachment component 21 by inserting screws in the attachment holes 22c and the first protrusion attachment holes 21b and then tightening.

After this, the worker runs the cables 22d to the cylindrical portion of the cable protector 21d. In addition, the worker connects the main board 22 to the display panel board 18, and connects the main board 22 to the display panel 11, via cables, connectors, etc. (not shown).

As shown in FIG. 7, in the next step the third board attachment component 23 is attached. The third board attachment component 23 is a member made of sheet metal. A plurality of attachment holes 23a and a plurality of protrusion attachment holes 23b are formed on the third board attachment component 23. A cut-out 23c is formed in the third board attachment component 23, and the cables 22d pass through this cut-out 23c. The third board attachment component 23 is attached to the second board attachment component 21 by inserting screws into the attachment holes 23a and the second protrusion attachment holes 21c and then tightening.

Figure 8:
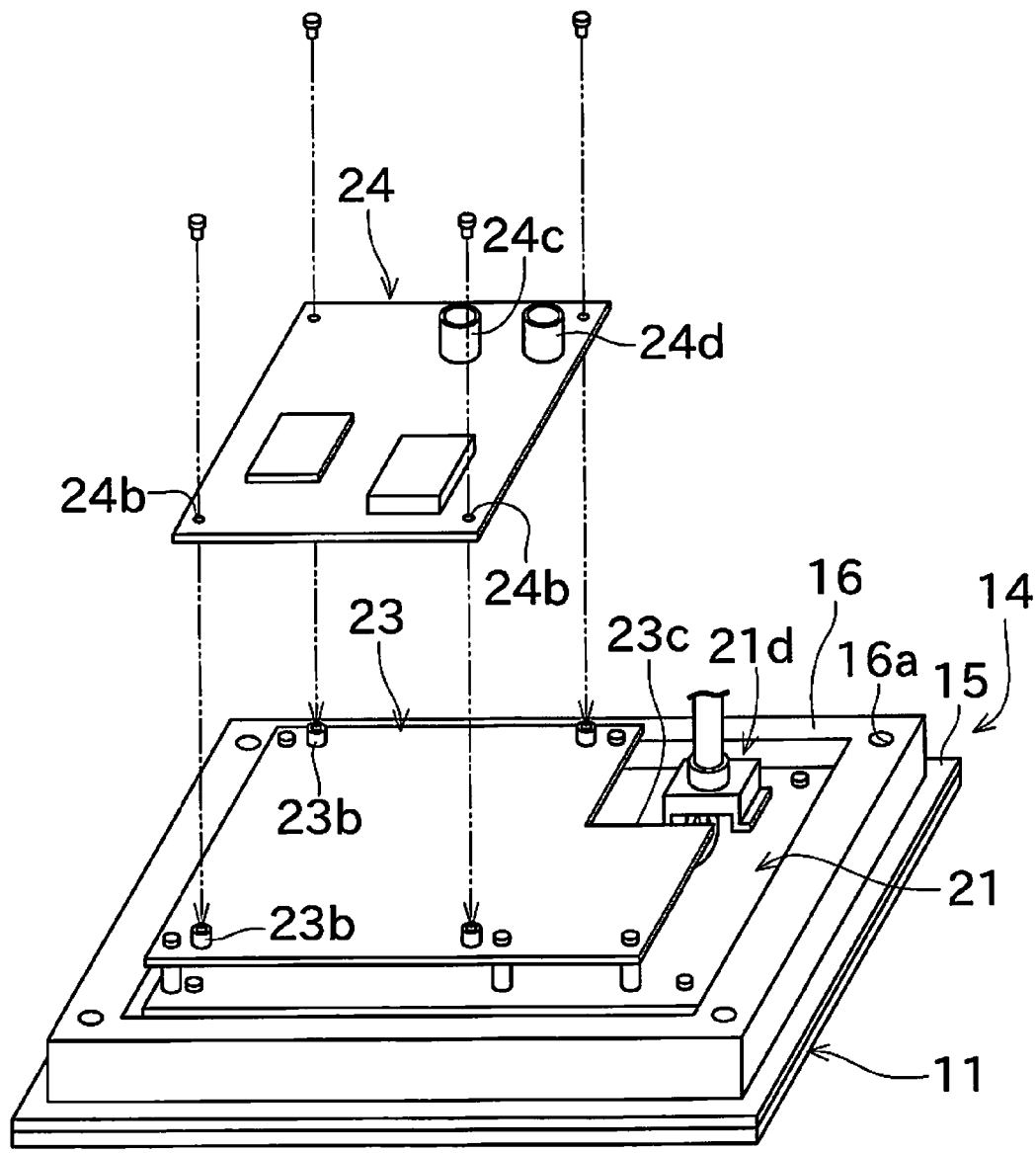
FIG. 8 is an oblique view of when a power supply board is attached.

As shown in FIG. 8, in the next step the power supply board 24 is attached. A plurality of attachment holes 24b, a power supply cable connector 24c, and a fish finder cable connector 24d are formed on the power supply board 24. The power supply cable connector 24c allows the connection of a cable for connecting to the external power supply 1. The fish finder cable connector 24d allows the connection of a cable for connecting to the fish finder 2. The power supply board 24 is attached to the third board attachment component 23 by inserting screws into the attachment holes 24b and the protrusion attachment holes 23b and then tightening. After this, the worker connects the power supply board 24 and the main board 22 via a cable, connector, or the like (not shown).

Figure 9:
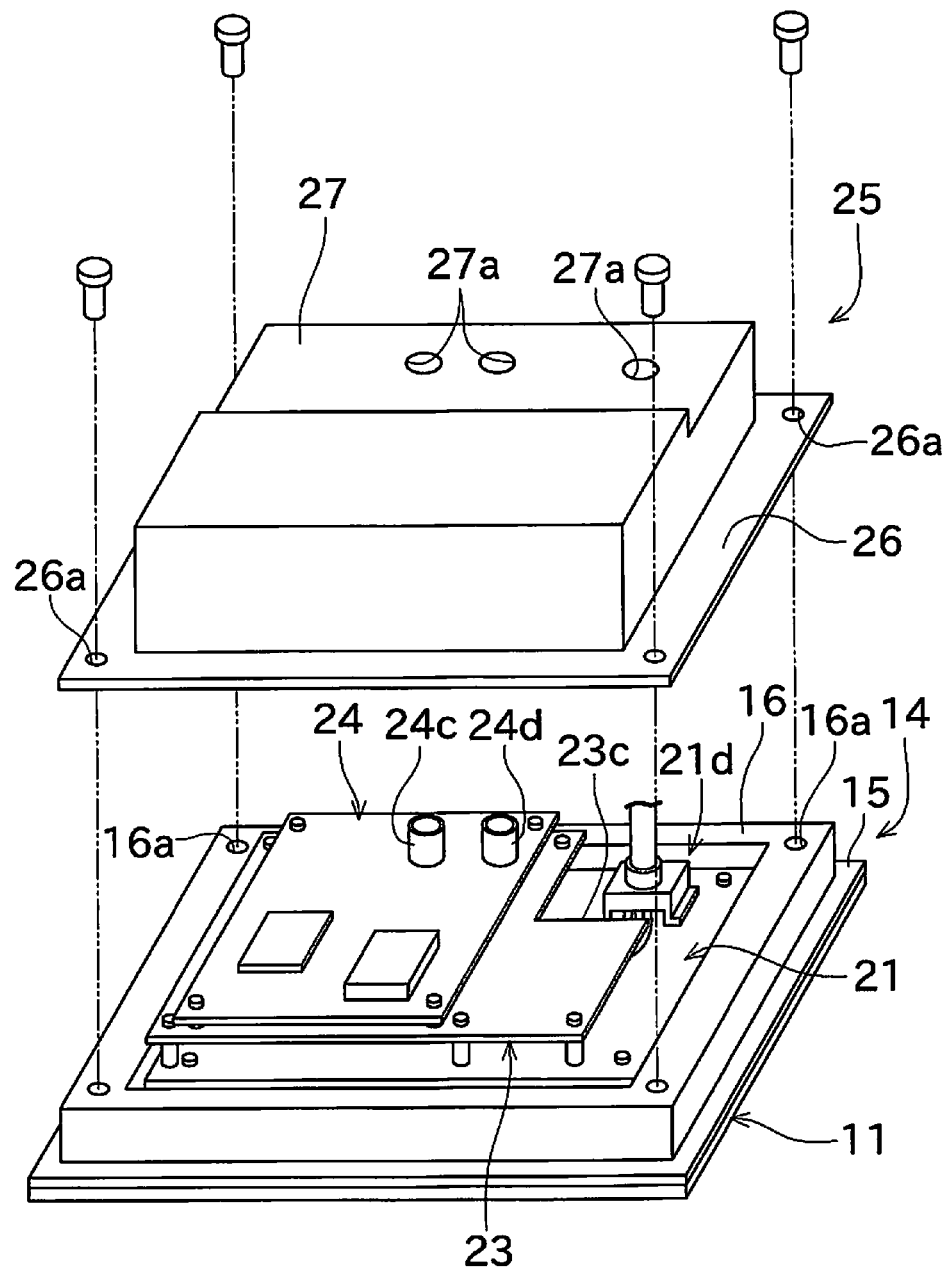
FIG. 9 is an oblique view of when a control-side housing is attached.

As shown in FIG. 9, in the next step the control-side housing 25 is attached. The control-side housing 25 covers members disposed inside the display device 5, along with the display panel-side housing 14. The control-side housing 25 comprises a housing connector 26 and a cover 27.

The housing connector 26 is located on the rear side of the control-side housing 25, and is a flat portion that constitutes the edges of the control-side housing 25. A plurality of attachment holes 26a are formed in the housing connector 26. The cover 27 is a box-shaped portion formed so as to protrude further to the rear from the housing connector 26.

A plurality of cable insertion holes 27a for running the cable protector 21d (cables 22d), the power supply cable connector 24c, and the fish finder cable connector 24d to the outside are formed in the rear face of the cover 27. A space is formed in the interior of the cover 27, and the main board 22, the power supply board 24, and so forth are located in this space.

Figure 10:
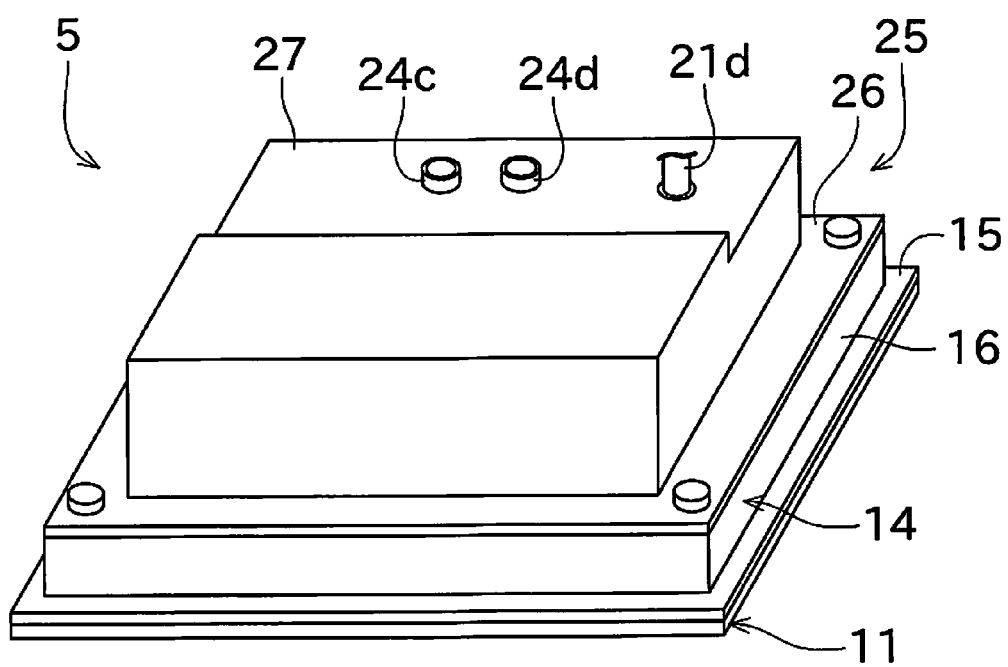
FIG. 10 is an oblique view of when a control-side housing has been attached.

The control-side housing 25 is attached to the display panel-side housing 14 by inserting screws into the attachment holes 26a and the attachment holes 16a and then tightening (see FIG. 10). This allows the cables 22d, the power supply cable connector 24c, and the fish finder cable connector 24d to be exposed on the outside (the rear side) through the cable insertion holes 27a.

This completes the assembly of the display device 5. Thus, in this embodiment assembly can be performed by stacking the boards and board attachment components, so assembly can proceed while the boards are connected. Accordingly, in attaching the control-side housing 25 to the display panel-side housing 14, the cables connecting the boards together can be prevented from being pinched between the two housings.

Here, the second board attachment component 21, the main board 22, the third board attachment component 23, the power supply board 24, and the control-side housing 25 are members that do not depend on the screen size of the display panel 11, including the main board 22. These members will hereinafter be referred to collectively as a control block 20.

Figure 11:
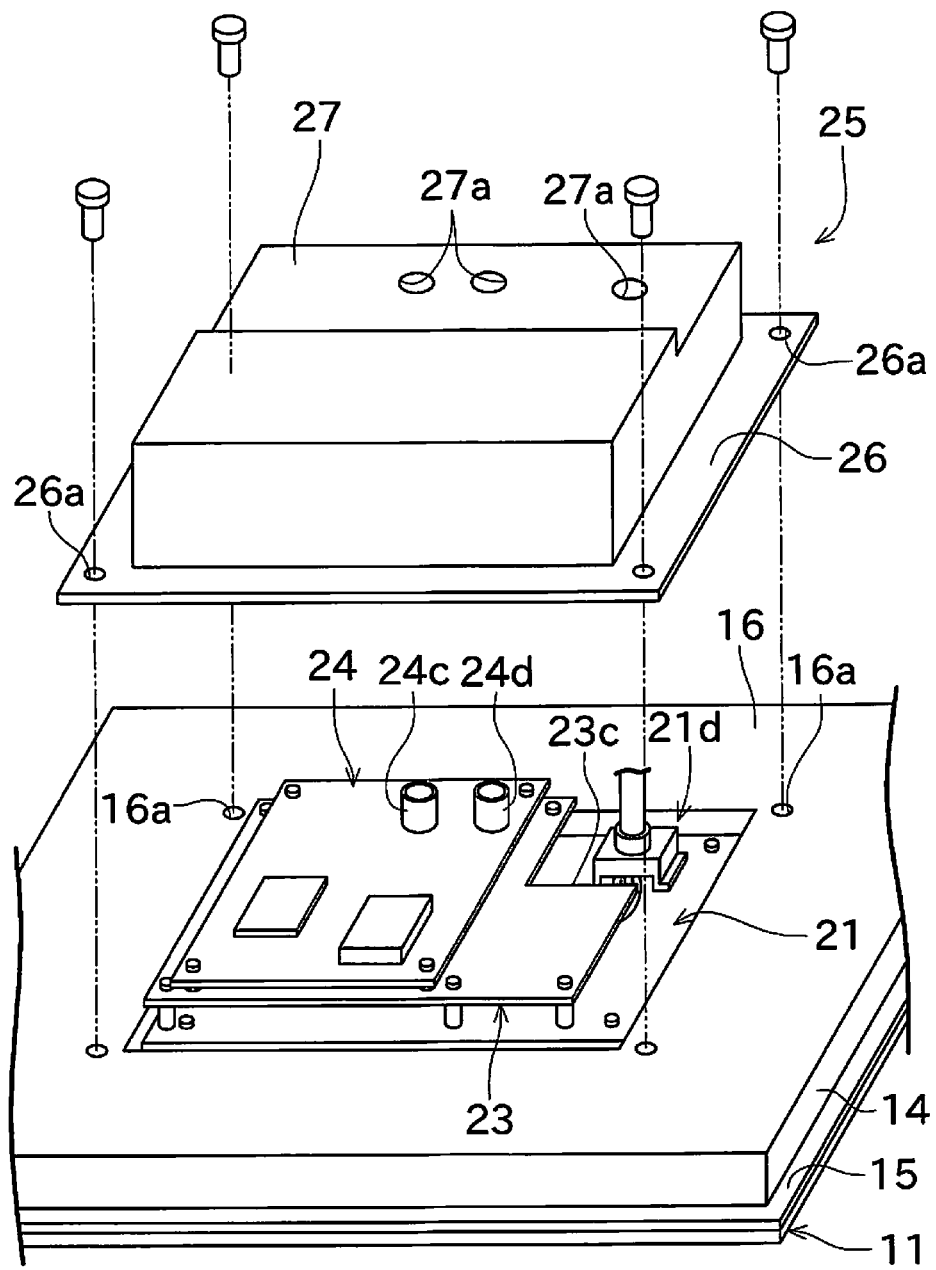
FIG. 11 is an oblique view of when a control-side housing is attached when the screen size of the display panel is different.

The control block 20 does not depend on the screen size of the display panel 11. For example, the control block 20 is connected using the same interface for a plurality of types of display panel block 10 of different screen sizes. Therefore, as shown in FIG. 11, the control block 20 can be attached to another display panel block 10 in which the screen size of the display panel 11 is different. Thus collectively treating those members that are not dependent on the screen size of the display panel 11 as the control block 20 allows many members to be shared. Accordingly, when manufacturing a number of models of the display panel 11 of different screen sizes, or when newly manufacturing a model in which the screen size of the display panel 11 has been changed, existing parts can be used, and this keeps the cost lower.

As described above, the display device 5 in this embodiment comprises the display panel 11, the first board attachment component 13, the display panel board 18, the second board attachment component 21, the main board 22, the third board attachment component 23, and the power supply board 24. The display panel 11 is able to display images. The display panel board 18 is attached to the first board attachment component 13, and controls hardware that is dependent on the screen size of the display panel 11. The main board 22 is attached to the second board attachment component 21, stores a plurality of display programs that display images on the display panel 11, according to the screen size of the display panel 11, and performs control to display images on the display panel 11 using one of the stored display programs. The power supply board 24 is attached to the third board attachment component 23, and supplies power used by the display panel board 18 and the main board 22. The first board attachment component 13, the display panel board 18, the second board attachment component 21, the main board 22, the third board attachment component 23, and the power supply board 24 are located on the rear side of the display panel 11, in this order starting from the display panel 11 side. In particular, in this embodiment, the members are each attached to a member that is closer to the display panel 11 than itself.

Consequently, the main board 22 may sometimes store programs corresponding to a plurality of display panels 11, which can share the control block 20. Therefore, a change in the screen size of the display panel 11 entails less of a cost increase. Also, it is possible to manufacture the display device 5 by stacking up the various members from the display panel 11 by attaching each of the members to a member that is closer to the display panel 11 side than itself. Therefore, the manufacturing process can proceed while the boards are connected together by cables, so routing of the cables is easier and the manufacturing process can be simplified.

A preferred embodiment of the present invention was described above, but the above configuration can be modified as follows, for example.

The shapes of the housings, boards, and board attachment components that constitute the display device 5 are just examples, and can be suitably modified. For instance, of the third board attachment component 23 and the power supply board 24, a cut-out is formed only in the third board attachment component 23, but a cut-out may be formed in the power supply board 24 as well. In this case, the cables 22d will pass through the cut-outs formed in the third board attachment component 23 and the power supply board 24.

The boards and board attachment components disposed in the interior of the display device 5 may be attached at different locations from those in the above embodiment, so long as each one is attached to a member that is closer to the display panel 11 than itself. For example, the first board attachment component 13 may be attached to the display panel-side housing 14, rather than to the display panel 11. Also, the third board attachment component 23 may be attached to the display panel-side housing 14, rather than to the second board attachment component 21.

Power may be supplied to the display panel board 18 from the power supply board 24 without going through the main board 22. Also, the image signal may be inputted to the main board 22 via the power supply board 24.

The display device 5 may also comprise other, different boards (such as a board for reading a memory card), so long as it includes the display panel board 18, the main board 22, and the power supply board 24.

The display device of the present invention is not limited to marine use, and can be applied to a wide variety of devices, such as a personal computer or a navigation unit for some other type of moving vehicle.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A display device comprising:
a display panel configured to display an image;
a first board attachment component;
a display panel board attached to the first board attachment component and configured to control hardware dependent on the screen size of the display panel;
a second board attachment component;
a main board attached to the second board attachment component, configured to store a plurality of display programs that produce the image to be displayed on the display panel, according to the screen size of the display panel, and configured to perform control for displaying the image on the display panel by using one of the stored display programs;
a third board attachment component; and
a power supply board attached to the third board attachment component and configured to supply power used by the display panel board and the main board,
wherein the first board attachment component, the display panel board, the second board attachment component, the main board, the third board attachment component, and the power supply board are disposed in this order, starting from the rear side of the display panel.

2. The display device according to claim 1, comprising:
a display panel-side housing covering at least part of the display panel; and
a control-side housing attached to the display panel-side housing,
wherein the control-side housing is attached only to the display panel-side housing, out of the display panel-side housing, the first board attachment component, the second board attachment component, and the third board attachment component.

3. The display device according to claim 2, wherein
when the display panel-side housing, the display panel, the first board attachment component, and the display panel board form a display panel block, and
the control-side housing, the second board attachment component, the main board, the third board attachment component, and the power supply board form a control block,
then the control block is connected using the same interface with a plurality of types of display panel blocks having different screen sizes.

4. The display device according to claim 1, comprising
a wired signal transmission component configured to transmit signals from an external device to the main board without going through the power supply board.

5. The display device according to claim 4, wherein
the signal transmission component includes at least one of a LAN cable, a USB cable, and an image transmission cable.

6. The display device according to claim 4, wherein
a cutout is formed in at least one of the third board attachment component and the power supply board, and the signal transmission component is disposed to pass through the cutout.

7. The display device according to claim 1, wherein
the display panel board performs at least one of control related to a backlight and control related to a touch screen.

8. The display device according to claim 1, wherein
the main board is configured to automatically read one of the display programs corresponding to the screen size of the display panel by being connected to the display panel or the display panel board.

9. A display device manufacturing method comprising:

a first step of attaching a first board attachment component to the rear side of a display panel that is configured to display an image;

a second step of attaching a display panel board that is configured to control hardware dependent on the screen size of the display panel, to the rear face of the first board attachment component, where the rear side is the opposite side from the side where the display panel is located;

a third step of attaching a second board attachment component further to the rear side than the display panel board;

a fourth step of attaching a main board that is configured to store a plurality of display programs that produce the image to be displayed on the display panel, according to the screen size of the display panel, and is configured to perform control for displaying the image on the display panel by using one of the stored display programs, on the rear face of the second board attachment component;

a fifth step of attaching a third board attachment component further to the rear side than the main board; and a sixth step of attaching a power supply board that is configured to supply power used by the display panel board and the main board, to the rear face of the third board attachment component.

10. The display device manufacturing method according to claim 9, wherein in the first and second steps, the first board attachment component and the display panel board that are selected according to the screen size of the display panel are used, and in the third, fourth, fifth, and sixth steps, the second board attachment component, the main board, the third board attachment component, and the power supply board that have a configuration that is not dependent on the screen size of the display panel are used.

* * * * *